May 5, 1931.  E. ABA  1,803,541
PROCESS OF ATTACHING EXTERNAL ELECTRODES
Filed Dec. 3, 1929
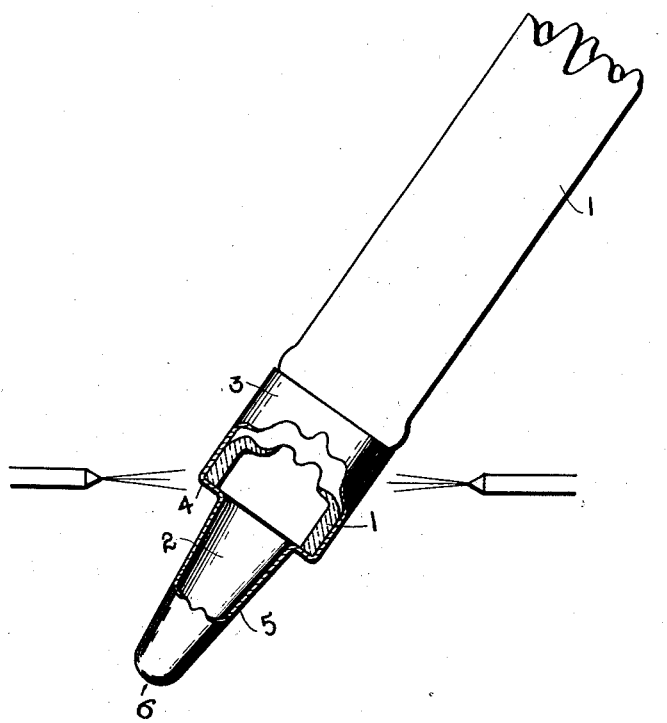
INVENTOR.
Eugene Aba
BY
ATTORNEY Patented May 5, 1931

1,803,541

UNITED STATES PATENT OFFICE

EUGENE ABA, OF OAKLAND, CALIFORNIA, ASSIGNOR TO NEON APPLIANCES LTD. OF AMERICA, OF EMERYVILLE, CALIFORNIA, A CORPORATION OF NEVADA

PROCESS OF ATTACHING EXTERNAL ELECTRODES

Application filed December 3, 1929. Serial No. 411,264.

This invention relates to improvements in the process of attaching external electrodes, and more particularly to the method of sealing the electrodes to luminescent discharge tubes.

This invention will be disclosed with particluar reference to such tubes using neon, helium, mercury vapor, mixtures thereof, and similar gaseous media adapted to be rendered luminescent by electrical discharges therethrough.

Gaseous mixtures using neon gas are very sensitive to dilution by occluded gases within the tubes and by volatile products of distillation in the form of metallic vapors from the metal electrodes at the opposite ends of the tubes.

The principal object of the invention is to create a hermetic bond between an external metallic electrode and the end of a glass tube.

Another object is to provide a process of preparation, cleansing and coating, and forming the electrodes, and treating the glass tubing, to insure a weld-like bond between the electrode and the glass, and minimize the effects of the difference in the coefficients of expansion and contraction between the metallic electrode and the glass tube.

In this specification and the annexed drawings, the invention is disclosed in the form considered to be the best, but I do not wish to be understood as confining it to this form, because it may be embodied in other forms. It is also to be understood that in and by the claims following the description it is desired to cover the invention in whatsoever form it may be embodied.

In the accompanying one sheet of drawing, the method of fusing the weld between the electrode and the glass tube is diagrammatically illustrated.

In detail the construction illustrated in the drawing comprises the open ended glass tube 1, having the electrode 2 sealed over the end thereof.

The electrode is preferably composed of the purest form of copper obtainable, such as produced by electric refinement.

The sleeve or ferrule 3 of the electrode is shaped to fit freely the outside diameter of the tube 1. The length of this sleeve is preferably equal to the diameter of the tube. That is, one-half inch sleeve length for one-half inch outside diameter tubing gives very satisfactory results; other tube and sleeve lengths in proportion.

The diameter of the sleeve is reduced to slightly less than the internal diameter of the tube to form the shoulder 4. From the shoulder the discharge area of the electrode is gradually tapered as at 5 and terminates in the concave end 6.

The walls of the electrode from sleeve to tip 6 are preferably of uniform gauge or cross-section. In general practice about .005 of an inch in thickness gives the best results.

The success of the tube equipped with electrodes in accordance with this invention depends to a great extent upon the proper preparation of the tube and the electrode before they are assembled together and also upon the proper care in joining them to insure a vacuum tight union of the glass and metal.

The electrodes may be spun, formed in dies, electro-deposited, or otherwise brought to form. They must be carefully inspected for perforations and other imperfections.

The perfected electrode is then heated electrically or in a suitable flame such as a Bunsen gas flame, or otherwise, with the open end upward to permit the escape of incidental gases and vapors from the electrode. The temperature should be sufficient to cause a brilliant copper red, preferably greater than the operative temperature of the finished electrode on the luminescent tube.

The electrode is then plunged into alcohol or other similar solvent, which quenches the heat. The electrodes should enter the alcohol with the open end upward so that the spirit flows into the electrode down the walls and drives the incidental gases upward out of the center of the electrode. It is advisable to use a small quantity of alcohol at a time and close the container immediately after the electrode is inserted. The electrode is left to cool thoroughly in the alcohol, which also prevents oxidation.

The electrode is then removed, dried in an air blast, and again heated to the said temperature and similarly inserted in a saturate solution of borax in distilled water and quenched. The open pores of the copper electrode absorb a certain amount of the borax. The surface also becomes heavily coated with the borax, which dries and crystalizes thereon when the excess solution is drained out of the electrode, which is then ready to join to the glass.

It is preferable to use a short length of glass tube, about one foot long for convenience. The tube 1 should be previously cleaned with a weak nitrate solution, then rinsed with distilled water and thoroughly dried in an air blast or otherwise.

The outer surface of the end of the glass tube which is inserted into the sleeve 3, may be sand blasted or acid etched to facilitate welding, but this is not essential. The prepared end of the short length of glass tube is inserted into the sleeve down to the shoulder 4.

Thus assembled, the end of the electrode is grasped with a suitable tool in one hand and the length of tubing held in the other hand. The sleeve portion is then rotated at an angle within a cross flame burner, with the open end of the tube upward to permit escape of gases from the tube and sleeve.

The welding temperature is indicated when the sleeve shows a rich cherry red and the glass adjacent indicates the fluxing and fusion point. The operator then pushes the tube gently into the sleeve to seat it firmly against the shoulder 4, after which he blows gently into the end of the glass tube to expand the opposite end tightly into the sleeve 3 and cause it to swell slightly and flange over the end of the sleeve.

The still hot tube end is then inserted into an annealing oven and the temperature slowly lowered until it gradually cools. The glass tube 1 is then severed about 2 inches above the sleeve 3. The electrode stubs are then heated and cooled again to drive off residual gases, and the bond or weld between the glass tube and the electrode tested by vacuum.

By holding the rotating tube in the flame at a suitable angle, the progress of the weld can be inspected constantly. If the rules of cleanliness and inspection known to those skilled in the art have been followed, a perfect weld can be made in accordance with this invention in practically every instance. The perfected stubs are then ready to fuse to the discharge tube in the usual manner.

The lateral discharge from an internal electrode is avoided by the conical taper of the external electrode 5. The electrical discharge is coaxial with the tube 1. The joint at 4 is protected against direct bombardment by reducing the internal diameter of the electrode to less than the internal diameter of the tube 1. Lateral deposits on the tube walls and the danger of puncturing are reduced to the minimum by the present form of electrode. The necessity for dumet and other conductors and supports through the walls of the tube, with their cost and incidental disadvantages, are eliminated by the external electrode shaped and applied in accordance with this invention.

Having thus described this invention what I claim and desire to secure by Letters Patent is:

1. The process of attaching electrodes to glass tubes, consisting of heating the electrodes and quenching them in spirit; reheating the electrodes and quenching them in an alkaline solution; telescoping the electrode and glass tube ends welding them together by heat.

2. The process of attaching external electrodes to glass tubes consisting of heating the electrodes and driving off occluded gases, quenching the electrodes in alcohol, open end upward; reheating the electrodes and quenching them in a saturated alkaline solution; telescoping the electrode over the glass tube and welding it thereto by heat.

3. The process of attaching electrodes to glass tubes consisting of heating the electrodes to a red heat and quenching them in alcohol with the open ends upward; reheating and quenching them in a saturate solution of borax; telescoping the electrodes and glass tube ends and heating them to the fusion point of the glass tubes; expanding the tube ends into the electrodes and then slowly cooling them.

4. The process of attaching metal electrodes with thin walls of uniform thickness and closed at one end to stub lengths of glass tubing consisting of heating the electrodes to a red heat and quenching them in alcohol with the open ends upward; reheating and quenching them in a saturate solution of borax; telescoping the electrodes and glass tube ends and heating the joined portions to the fusion point of the glass tubes; pushing the tube and electrode together and blowing into the end of the tube; then slowly cooling them.

In testimony whereof I have hereunto set my hand this 19th day of November A. D. 1929.

EUGENE ABA.